Figure 1:
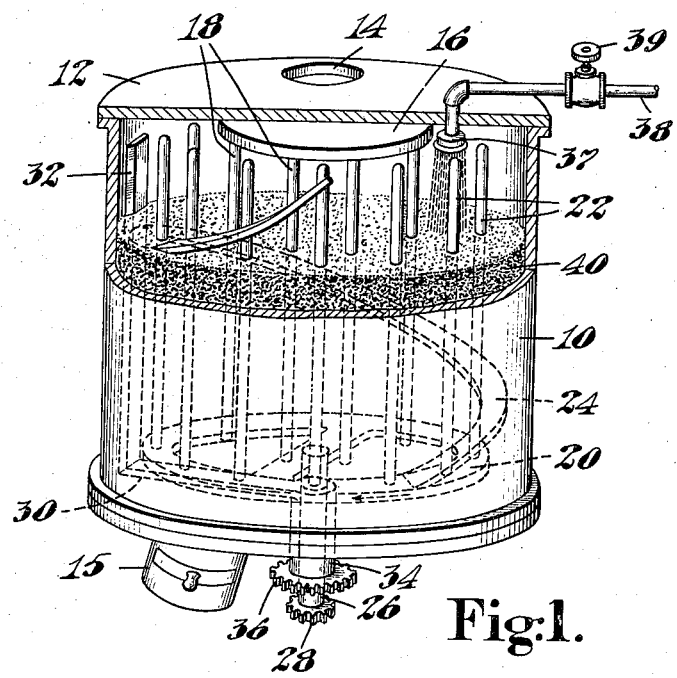

June 21, 1938.  F. H. AMON  2,121,535

GRANULAR PRODUCT AND METHOD OF PREPARING THE SAME

Filed Sept. 22, 1934

INVENTOR
Fred H. Amon.
BY Kenway & Witter
ATTORNEYS

Patented June 21, 1938

2,121,535

UNITED STATES PATENT OFFICE 2,121,535

GRANULAR PRODUCT AND METHOD OF PREPARING THE SAME

Fred Hughes Amon, Weston, Mass., assignor to Godfrey L. Cabot, Inc., Boston, Mass., a corporation of Massachusetts Application September 22, 1934, Serial No. 745,089

10 Claims. (Cl. 134—58)

This invention relates to a new product of manufacture comprising a fine powder or pigment, such as carbon black, agglomerated with water and a dispersing agent into compact granules which present the pigment in condition to be readily dispersed upon addition of more water or when incorporated in a wet mixture. The invention includes within its scope a novel method of manufacturing such product.

An important field of use of my invention is in the production of colored concrete, or other cement-containing materials. Hitherto carbon black has been supplied for such purposes in the form of an emulsion, known commercially as "Charon", and consisting of about one part of carbon black in three parts of water solution containing a dispersing agent, such as nigrosine. The emulsion is distributed in metal containers and is commonly used in mixing dark colored concrete for roads or dark stripes or lanes in concrete roads of lighter color. It has the valuable property of coloring the concrete without impairing its strength, as explained in the U. S. Patent 1,910,419, granted May 23, 1933 on my application filed March 6, 1931.

I have discovered that by treating flocculent carbon black with a liquid solution containing a water soluble dispersing agent and at the same time, or subsequently, suitably agitating it, the carbon black may be brought into a readily dispersible condition and also converted into a granular or pellet form containing substantially equal parts of carbon black and liquid uniformly distributed therein. This product possesses many useful characteristics. In the first place, it may be prepared where the carbon black is manufactured in the natural gas fields and transported in condition ready for immediate use. Then, for a given amount of carbon black, the total weight of the product thus transported is only one-half that of the product as transported in emulsion form. Further, since the novel product contains substantially twice the carbon black content of the emulsion, weight for weight, the same results may be secured by using one-half as much of the granular product in the mixture. Its composition is such that when it is used in a concrete mixture no correction is required in the liquid content of the concrete formula as is sometimes the case in using "Charon". Moreover, there is negligible tendency to corrosion of containers in transporting this granular product.

A further and more important characteristic of the novel product of this invention is that in the carbon black granules the liquid content is so firmly and tenaciously bound that it is not readily available for the hydration of such material as cement. The result is that the pellets and the other dry ingredients of concrete may be brought into contact with each other and left thus for an appreciable length of time without any deleterious effects resulting from premature hydration of the cement in the mixture.

Still another advantage of the product of my invention is that its colloidal characteristics are not upset, nor is its effect otherwise impaired by freezing and this permits shipping and storing in cold weather without special precautions. It is moreover substantially dustless and non-adherent and consequently relatively clean to handle and use.

While I have stressed the advantages of the new product of my invention in the concrete field, it is in no sense so limited in its application but has a broad use in any field wherein finely powdered pigments are used and where cleanliness of procedure is a consideration. For example, this new product is particularly well adapted for use as a pigment in the manufacture of black or dark colored papers. The advantages of dustlessness and of complete dispersion in the pulp mixture are particularly to be appreciated in this industry.

One of the most important aspects of my discovery is that I have found that it is possible to produce a dry or an apparently dry pellet consisting of carbon black, water and dispersing agent from which a thorough dispersion of the carbon black can be made by the simple addition of water.

By adding an aqueous solution of the dispersing agent to the dry carbon black in the manner described, all of the dispersing agent is brought into most intimate contact with the carbon black and is quite possibly adsorbed to some extent onto the surface of the individual black particles. Thus every bit of the dispersing agent is made available for exercising its maximum effect on the carbon black. Little if any, of the dispersing agent is diverted onto the sand or cement particles also present in the mix, when, in due course, the treated carbon black is distributed throughout the mass and the necessary water is added to the entire mixture. The product of my invention thus affords a mathematically correct means of making a uniform distribution of two ingredients, such as carbon black and a dispersing agent, throughout the mass of a third medium, such as concrete mixture.

Figure 2:
Figure 3:
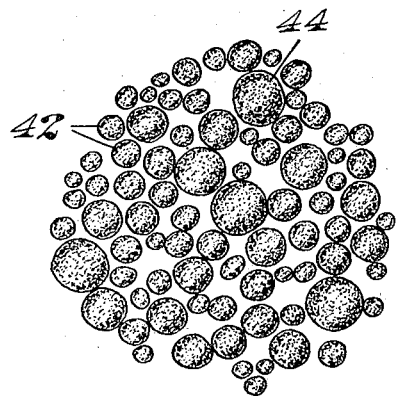

These and other features of the invention will be best understood and appreciated from the following description of one preferred manner of preparing the novel product of my invention, explained in connection with the accompanying drawing illustrating one form of suitable apparatus therefore. In the drawing, Fig. 1 is a view in perspective showing apparatus with portions of its wall broken away;

Fig. 2 is a sectional view of a single spherical granule on a greatly enlarged scale, and Fig. 3 is a similar view of a group of granules as seen in the field of a microscope.

The apparatus herein illustrated is typical only and any apparatus effective to agitate the flocculent carbon black while subjected to an atomized or sprayed application of liquid containing a dispersing agent may be satisfactorily employed.

The desired product may be prepared by treating the light, fluffy and coherent flocculent carbon black as it is removed from the channel irons and having a density of about four pounds per cubic foot, with approximately a three per cent aqueous solution of water soluble nigrosine, "Alkanol B", or other dispersing agent. "Alkanol B" is the trade name under which is marketed one of a large group of alkylated naphthalene sulphonates. If to a mass of flocculent carbon black substantially an equal weight of liquid be added during agitation in the form of a spray, the whole mass of carbon black will be converted into pellets or granules from approximately about one-thirty-second to one-quarter inch in diameter and somewhere between 30 and 50 lbs. per cubic foot in apparent density. This product is complete, ready for use and may be put up in cans or other containers for shipment.

The apparatus illustrated comprises a vertically-disposed cylinder or drum 10 having a removable cover 12 provided with a hand hold 14 and a discharge chute 15 in its bottom. Secured to the inner face of the cover 12 is a disk 16 from which project downwardly a series of stationary baffle rods 18 arranged substantially concentrically in the drum. A disk 20 is mounted for rotation near the bottom of the drum and provided with a series of upwardly-projecting baffle rods 22 arranged concentrically in a circle outside the stationary baffle rods 18. The rotatable disk 20 also carries a flat spiral band 24 which extends to a point adjacent the upper ends of the baffle rods 22. The disk 20 is secured to and driven by a shaft 26 which is mounted in suitable bearings beneath the bottom of the drum and provided at its lower end with a pinion 28 by which it may be rotated through any suitable gear train. Beneath the disk 20 is located a bottom scraper 30, and from the outer end of this extends an upright side scraper 32. The bottom scraper 30 is secured to and driven by a sleeve 34 mounted in suitable bearings concentrically with respect to the shaft 26 and provided with a driving gear wheel 36 by which the scrapers may be driven independently of and at a slower rate than the cage formed by the disk 20 and the baffle rods 22. In the upper part of the drum is provided an atomizing nozzle 37 supplied by a pipe 38 and controlled by a valve 39.

One example of the manner in which the above described apparatus may be used in carrying out the novel process of my invention is as follows. The drum 10 is supplied with a charge of 100 lbs. of dry commercial carbon black and this may be any of the cheaper grades of carbon black used in the manufacture of rubber or ink and having an apparent density in bulk of 3 or 4 lbs. per cubic foot. The mass of carbon black in the drum is indicated by reference character 40. A three per cent water solution of water soluble nigrosine is supplied through the pipe 38 and the valve is adjusted to admit the solution at the rate of about 100 lbs. in thirty minutes. Power is supplied to rotate the scrapers at the rate of about two revolutions per minute and the disk 20 with its baffle rods 22 at a rate of about forty revolutions per minute.

The water solution supplied by the nozzle 37 is in the form of a mist or fine spray and is effective first on the particles of black which happen to be, at the moment, on the top of the mass. As the operation continues, the effect of the mechanical construction of the apparatus, particularly the effect of the spiral band 24, is to replace the particles first dampened with other dry material, thus producing in turn further dampened particles and subjecting the particles already dampened to contact with dry material which thereupon agglomerates upon it and produces pellets of generally spheroidal form, and this continues as the whole carbon black mass is agitated by the movement through it of the baffle rods 22 and the spiral member 24. The stationary baffle rods 18 prevent movement of the carbon black mass as a whole and cause a general agitation and flowing of the particles upon each other so that nuclei are formed and moved in the mass, brought into contact with other particles, and turned so that they tend to build up systematically and progressively and form homogeneous bodies. In this process the up-and-down motion imparted to portions of the carbon black mass by the spiral band 24 is particularly important. The action of the scrapers is to prevent caking of the carbon black upon the bottom and side walls of the drum.

As already noted, the granules produced by the process are substantially spheroidal in form and usually run from $\frac{1}{32}$ to $\frac{1}{4}$ inch in diameter, with a preponderance of the smaller sizes. The granules are substantially homogeneous in internal structure and of sufficient tenacity to withstand transportation in bulk without disintegrating. Their apparent density in bulk is about 37 lbs. per cubic foot, or 5 lbs. per gallon, and of this approximately fifty per cent is 3% aqueous solution of nigrosine and the balance commercially pure carbon black ready to be colloidally dispersed, as already explained. The product is never reduced to the condition of a paste nor does it exhibit free liquid but appears at all stages to be a dry product, the added moisture being absorbed or entrained in the carbon black without visible excess. The amount of water contained in the commercial product is of secondary importance so long as the introduction of the dispersing agent is effected in the presence of an amount of liquid between the limits above suggested.

The product may be shipped in metal containers direct from the point of manufacture to the point of use and added to the dry concrete mix. Used in this manner, one pound of the granular product is the equivalent of two pounds of liquid emulsion. Satisfactory results are secured by employing in a concrete mix an amount of carbon black in colloidally dispersed form, equal to one percent or less of the cement content. For example, with each 100 pounds of Portland cement there may be advantageously mixed 32 pounds of the granular product of my invention.

It has been found that by employing in the concrete mix carbon black colloidally dispersed, satisfactory coloring may be secured with a pigment content less, to a striking degree, than has been heretofore required and, moreover, that the use of carbon black in colloidally dispersed form, not only does not impair the strength of the colored product, but in some cases actually improves it. For example, I have found it entirely practicable to produce with ½% content of dispersed carbon black a black concrete comparing favorably in color to that containing 8% ordinary, dry, undispersed carbon black, and in the structure so produced the tensile strength of the concrete will be 102 or 103% that of uncolored concrete of the same formula. It has been suggested that, when carbon black particles have been once dispersed, they do not release the water with which they are associated so that in effect, no additional free water is brought into the concrete mixture by addition to it of this novel product. Whatever may be the explanation, experience has shown that the use of this product requires no modification of standard concrete formulas. As one example of a satisfactory water-soluble dispersing agent I may mention nigrosine which is now on the market as "Nigrosine W. S. B.," supplied by E. I. DuPont de Nemours & Co. Inc. The dispersing agent used must be soluble in water because in the product it is desired to disperse carbon black in water.

In some cases it may be advisable to use alkylated naphthalene sulfonic acids or their derivatives either for their dispersing or wetting properties and one of the best of these is the sodium salt of butyl naphthalene sulfonic acid now available in the market as "Alkanol B".

The granular product of my invention constitutes one convenient form by which a colloidally dispersed pigment may be made available, under convenient conditions, for use in any industry where such pigment is employed. I have referred to nigrosine as one suitable dispersing agent for use in producing novel granules of my invention but contemplate employing others, as well as combinations of dispersing agents or of dispersing agents and wetting agents. While "Alkanol B" has dispersing properties it is chiefly useful in this connection as a wetting agent and assists the pigment in faster reaching a fully dispersed condition in the granules. Accordingly, it may be desirable to employ an aqueous solution of a dispersing agent, such as nigrosine, combined with a wetting agent, such as "Alkanol B" and such procedure is contemplated. A 3% water solution of nigrosine has been suggested as being satisfactory in the case of carbon black, but this is by way of example and not limitation, for I contemplate using a solution of whatever concentration may be best adapted for current requirements and in many cases a far higher concentration has proved desirable.

The general appearance of the granular product of this invention, as observed in the field of a microscope, is suggested in Fig. 3. It will be noted that the granules are all substantially spheroidal in shape and that they vary in size, for example, from granules 42, which may be 1/32 inch in actual diameter, to granules 44 which may be ⅛ inch in actual diameter. In internal structure the granules are of homogeneous texture, as suggested by the magnified sectional granules 46 shown in Fig. 2.

Having thus described my invention, what I claim as new and desire to secure by Letters Patent of the United States is,

1. The process of making a carbon black product for use in producing dark colored concrete, which consists in gradually adding to one part of dry carbon black not more than one part of water containing a water-soluble alkylated naphthalene-sulphonate dispersing agent, and at the same time agitating the mixture to cause agglomeration of the particles of carbon black into distinct pellets, cohesive in structure, containing therein a substantial amount of said solution and having the property of mixing with cement substantially without hydrating reaction and of presenting carbon black in a form readily dispersible on the addition of water.

2. The process of making a carbon black product for use in producing dark colored concrete or the like, which consists in gradually adding to a mass of dry flocculent carbon black approximately an equal weight of an aqueous solution containing a combined total of about 3% water-soluble nigrosine plus a small amount of an alkylated naphthalene sulfonic acid wetting agent, and meanwhile agitating the mass to cause agglomeration of the wetted carbon black particles into coherent granules containing said agent in uniformly distributed condition and having the property of premixing with dry cement without immediate hydrating reaction and of presenting carbon black in condition to be readily dispersed on the addition of water.

3. As a new product of manufacture, separate compact granules of a powdered pigment having a substantially homogeneous cohesive internal structure, containing at least 25% by weight of the water solution of a water-soluble alkylated naphthalene sulphonate dispersing agent and having the capacity of mixing with dry cement without hydrating reaction and of presenting the pigment in condition to be readily dispersed on the addition of water.

4. As a new product, generally spherical pellets of carbon black containing, without apparent free liquid, substantially 50% of a 3% solution of water-soluble nigrosine, said pellets being substantially dustless and of sufficient cohesive strength as to withstand disintegration in transportation in the bulk and having the property of mixing with dry cement without inducing rapid hydrating action and also of presenting carbon black in a condition to be readily dispersed upon the addition of water.

5. As a new product of manufacture, granules containing wetted carbon black and including in their structure substantially 50% by weight of an aqueous solution of water-soluble nigrosine with a relatively small amount of an alkylated naphthalene sulfonic acid wetting agent and having the property of mixing with dry cement without appreciably hydrating the same and of presenting carbon black in condition to be readily dispersed on the addition of water.

6. The process of making a carbon black product for use in producing dark agglomerated material, which consists in gradually adding to one part of dry flocculent carbon black not more than one part of water containing a dispersing agent selected from the group which consists of water soluble nigrosine and water soluble alkylated naphthalene sulphonates, and agitating the mixture to cause agglomeration of the particles of carbon black into distinct pellets cohesive in structure containing therein a substantial amount of said solution, and having the property of mixing with cement substantially without hydrating reaction, and of presenting carbon black in a form readily dispersible upon the addition of water.

7. As a new product of manufacture, separate, compact granules of a powdered pigment having a substantial cohesive integral structure containing at least 25% by weight of water containing a dispersing agent selected from the group which consists of water soluble nigrosine and water soluble alkylated naphthalene sulphonates and having the capacity of mixing with dry cement without substantial hydrating reaction and of presenting the pigment in condition to be readily dispersed on the addition of water.

8. The process of making a carbon black product for use in producing dark colored concrete, which consists in gradually applying to a dry mass of flocculent carbon black an aqueous solution containing a water-soluble dispersing agent having the dispersing characteristics of nigrosine and a water-soluble wetting agent effective for wetting carbon black particles, and agitating the mass to cause agglomeration of the carbon black particles into distinct coherent granules having no apparent free liquid and the property of mixing with dry cement without hydrating reaction and of presenting carbon black in a form readily dispersible upon the addition of water.

9. As a new product of manufacture, substantially spherical granules containing carbon black without free liquid and approximately 50% by weight of the water solution of a water-soluble alkylated naphthalene sulphonate, including therewith a small amount of a water-soluble wetting agent effective for wetting carbon black particles, said granules being sufficiently cohesive in structure to withstand transportation in bulk without substantial disintegration, and having the capacity of mixing with dry cement without rapid hydrating reaction and presenting carbon black in condition to be readily dispersed upon the addition of water.

10. The process of making a carbon black product which consists in adding gradually to a mass of dry flocculent carbon black an aqueous solution containing about 3% water soluble nigrosine, and meanwhile agitating the mass to cause agglomeration of the wetted carbon black particles into coherent granules containing the nigrosine in uniformly distributed condition upon substantially all carbon black particles, the nigrosine being introduced into said granules by an amount of liquid solution equal at least to 25% by weight of the granular product.

FRED HUGHES AMON.